United States Patent [19]
Jaubert

[11] Patent Number: 4,995,980
[45] Date of Patent: Feb. 26, 1991

[54] SYSTEM FOR BIOLOGICAL PURIFICATION OF WATER CONTAINING ORGANIC MATERIALS AND DERIVATIVE PRODUCTS

[76] Inventor: Jean M. Jaubert, Parc Coromandel, 18 Ave. Gravier, 06100 Nice, France

[21] Appl. No.: 307,613

[22] Filed: Feb. 8, 1989

[30] Foreign Application Priority Data

Feb. 8, 1988 [FR] France .................. 88 01553

[51] Int. Cl.$^5$ ............................................. C02F 3/30
[52] U.S. Cl. ..................... 210/602; 210/605; 210/607; 210/615; 210/617; 210/630; 210/150; 210/169; 210/256
[58] Field of Search ............ 210/602, 605, 607, 615, 210/616, 617, 630, 150, 151, 169, 256, 284, 290, 293

[56] References Cited

U.S. PATENT DOCUMENTS

| | | | |
|---|---|---|---|
| 699,345 | 5/1902 | Provost | 210/605 |
| 3,101,321 | 8/1963 | Austin et al. | 210/151 |
| 3,385,786 | 5/1968 | Klock | 210/602 |
| 3,487,440 | 12/1969 | Newsteder | 210/169 |
| 3,723,304 | 3/1973 | Storck | 210/602 |
| 3,815,547 | 6/1974 | Willinger et al. | 210/169 |
| 4,684,462 | 8/1987 | Augustyniak | 210/169 |

FOREIGN PATENT DOCUMENTS

| | | |
|---|---|---|
| 2001366 | 7/1971 | Fed. Rep. of Germany . |
| 2079100 | 11/1971 | France . |
| 2490623 | 3/1982 | France . |
| 2201408 | 9/1988 | United Kingdom . |

Primary Examiner—Richard V. Fisher
Assistant Examiner—Christopher Upton
Attorney, Agent, or Firm—Young & Thompson

[57] ABSTRACT

The treatment of water by a biological technique. The water to be treated circulates in the interior of the reactor, in the space (2) located above the partition (1). It is aerated and agitated by a diffuser (3); it enters the reactor by the opening (4) and leaves by the opening (5). A volume of confined water, poor in oxygen, occupies at the bottom of the reactor the space (6) located below the partition (1) and has across its thickness a layer supersaturated in oxygen (10) occupied by the microalgae and aerobic microorganisms; a region rich in oxygen (11) occupied by aerobic microorganisms; a region (12) poor in oxygen and occupied by anaerobic microorganisms; and an intermediate region (13) occupied by aerobic and anaerobic microorganisms. The invention is applicable particularly, in its closed circuit configuration, to aquaria and by means of either a closed circuit or an open circuit, to the treatment of water.

15 Claims, 3 Drawing Sheets

SYSTEM FOR BIOLOGICAL PURIFICATION OF WATER CONTAINING ORGANIC MATERIALS AND DERIVATIVE PRODUCTS

The present invention relates to the treatment of water by biological means, and more particularly a process for biological purification of fresh or salt water containing organic solid materials (particles of various sizes) and dissolved organic materials, and dissolved mineral substances resulting from the degradation of said organic materials, by means of aerobic and anaerobic microorganisms acting continuously in the same reaction region.

According to the process of the invention, the water is treated by means of aerobic microorganisms which degrade the organic materials, whose nitrogen compounds are degraded in two principal stages which are ammonization (deamination and ammonification) and nitrification (nitridation and nitration), and by means of heterotropic anaerobic microorganisms which reduce the freed nitrate ions by oxidation of the organic nitrogen compounds by using as an organic carbon source a portion of the carbon compounds present in the reaction medium (denitrification by heterotropic means).

Biological ammonization and nitrification are well known processes, used industrially to mineralize nitrogenous organic compounds present in domestic waste water and in aquarium waters.

The denitrification by heterotropic means is also a well known process which is beginning to be used industrially for rendering fresh water drinkable and the purification of aquarium waters. It requires the presence of an organic carbonaceous substrate.

However, the process of the invention is not limited to oxidation of nitrogenous organic compounds and the reduction of the nitrates present in the water to be treated. It is also capable of eliminating or neutralizing organic compounds containing sulphur and phosphorous, as well as numerous aromatic compounds, and particularly those which result from the degradation of vegetable pigments. However, the exact nature of the processes involved remains unknown to the applicant.

The process of the invention is applicable with greatest advantage to waters containing organic materials of natural origin. Thus, the process of the invention has particularly interesting application to the purification of aquarium water and ponds where it permits maintaining the purity, transparency, absence of color, and more generally the integrity of the biological and physico-chemical properties. The present invention is useful in closed circuit aquaria and particularly household aquaria of all sizes, to ponds and aquaria, to large public ponds and aquaria and to ponds used in aquaculture.

It is known that the microorganisms responsible for ammonization (deamination and ammonification) and nitrification require a medium rich in oxygen (aerobic medium), while the denitrifying heterotropic microorganisms require a medium poor in oxygen and a carbonaceous organic substrate. It will also be noted that all the microorganisms can develop and act efficaciously only at the surface of the material which lends them support. As a result, the purification by biological means of waters containing organic materials and derivative products require to this end:

that the microorganisms be secured to a support, that the "pollutants" (organic materials and derived products) contained in the treated water enter into contact with the microorganisms secured to their support surface (the contacts should have a frequency as high as possible), that all degraded "pollutant" (which is to say transformed to different products) leave rapidly the zone (site) where transformation took place, and that it be rapidly replaced by another "pollutant" coming into contact with the microorganisms to be in its turn degraded and so on, that the microorganisms responsible for ammonization (deamination and ammonification) and nitrification be disposed in a medium rich in oxygen (aerobic medium), that the heterotropic denitrifying microorganisms be disposed in a medium poor in oxygen and that they have a carbonaceous organic substrate.

Thus, the various known processes differ from each other by the means used to fulfill the conditions listed above. The state of the art can be defined by the following patents described as to their essential characteristics:

A large variety of inorganic materials of different structure, texture, porosity, chemical composition, etc. are used as microorganism supports. Examples are clay, sand, gravel, expanded clay, macro or micro-porous carbon, etc. Except for some (for example particulate glass, European patent No. 0155.669) these supports are not covered by patents. This is particularly the case with calcareous materials of natural origin, such as sand of organic origin, marl, coral and crushed shells, etc., which are used in several processes (for example European patent No. 0133.405 and French patent No. FR.A.2,490,623), by reason of their ability to neutralize acid products freed by the bacterial reactions, and to regulate the pH of water (buffer effect).

All the known processes use the same means to transport the pollutants into contact with the microorganisms secured to their support and to remove the products resulting from their degradation: the water circulates in contact with the material which serves as the support for the microorganisms. In certain cases, the water to be treated passes through the support which thus constitutes a filtering medium (filtration by percolation): for example the NITREX process, a registered trademark, and patent Nos. EP 0096.170, EP 0133.405, DE.A.3,434,678, EP A DE.A.3,434,678. In other instances, the material which serves as the microorganism support is suspended (activated sludge; for example patent Nos. EP 0008.471 and EP 0070.592) or agitated or stirred in the treated water (agitated reactors or fluidized beds; for example the patent No. EP 0046.901). The principal drawback of percolating filters is their unavoidable clogging which requires periodic cleaning operations or total or partial replacement of the filter medium. The principal drawback of the processes using activated sludges is that it is necessary at the end of the process to separate the purified water from the activated sludge. It is important to note that in all these processes, the water circulates in contact with the material which serves as the support of the microorganisms.

Various means are used to create and maintain the aerobic conditions required for the microorganisms responsible for ammonization and nitrification. In certain cases (activated sludges), the bubbles of oxygen or gas rich in oxygen blown into the base of the reactor serve both to oxygenate the treated water and to create a current having the effect of maintaining the sludge in suspension (for example Nos. EP 0070.592 and EP 0008.471). In the case of percolation reactors, the previously oxygenated water can flow through the filtering mass sufficiently rapidly that its oxygen content remains sufficiently high throughout its travel (as is the case of most aquarium filters); however, it is sometimes necessary to blow oxygen or a gas rich in oxygen, for example into the base of the reactor, such that the bubbles rise while passing through the filter medium, countercurrent to the water which passes by gravity through this same filter medium (for example the patent Nos. FR.A.2,490,623, and FR.A.2,079,100). Finally in certain percolating filters acting by streaming (for example denitrification stage of the Minireef process, registered trademark), the filtering medium is not completely impregnated with water. In this latter case, the oxygen concentration of the water which streams is maintained at an elevated value by simple contact with air which freely circulates, in the interstices of the filter medium. It is important to note that in all these processes the aerobic conditions are created and maintained by blowing oxygen or a gas rich in oxygen into the water to be treated, before and/or during treatment, or also by free circulation of the air in the interstices of the filter medium. In no case is oxygen produced at the interior of the material itself which serves as the support of the microorganisms.

In the processes utilizing a filter medium, the anaerobic conditions are created and maintained by isolating the filter mass from ambient air, by reducing the water flow and by elongating the path of the water in the interior of the filter medium (for example the patent Nos. EP 0096.170, EP 0133.405 and EP 0154.105).

The aerobic processes (ammonization and nitrification) require a medium rich in oxygen, while on the other hand the denitrification processes require a medium poor in oxygen. These contrary requirements make it difficult to assemble and operate continuously, in the same reaction space, the different microorganisms which are responsible for these processes. Thus most of the known processes carry out simultaneously, in the same space, only one or the other of the two categories of processes listed above, such that it is in general necessary to provide several devices serving to practice the complementary processes so as to obtain successively the mineralization of the organic materials by aerobic means, then the transformation by anaerobic means of the substances which result from this mineralization. However, certain succeed in achieving the simultaneous presence and simultaneous action in an undivided reactor, of the aerobic and anaerobic microorganisms.

According to European patent No. EP 0008.471, this result is achieved within a reactor containing water mixed with activated sludge in suspension, by regulating the agitation and oxygen content, so as to create, in the same reaction space, aerobic and anaerobic zones, which are successively traversed by the water to be treated. The principal drawbacks of this process reside in the fact that the constraints imposed to create and maintain the required conditions for the operation of the process are severe and it is necessary, at the end of the process, to separate the purified water and the activated sludge. It is important to note that the water to be treated traverses successively the aerobic and anaerobic zones, and that the substance which serves as the support for the different microorganisms used is an activated sludge maintained in suspension in the water to be treated.

Another known process consists in causing the water to be treated to pass slowly through a filter mass constituted by a porous or fibrous material completely impregnated with water and isolated from the ambient air, containing aerobic microorganisms and anaerobic microorganisms. In this case, the degradation of the nitrogenous organic materials by ammonization and nitrification is accomplished in the superficial layer of the filter mass, by aerobic microorganisms which consume the oxygen contained in the water. Thus, in the course of its travel, the water progressively loses the oxygen it contains, until the concentration of this gas is sufficiently low to permit the achievement of the biological denitrification process. This process has two important drawbacks. In the first place, the speed of flow of the water must be controlled, to prevent the denitrification process from being disturbed by an excess or lack of oxygen resulting respectively from too slow a flow or too rapid a flow of the water through the filter medium. When there is too much oxygen in the denitrification zone, the denitrification is incomplete and there will be liberation of nitrites. In the second place, the water which arrives in the zone in which denitrification is effected, no longer contains carbonaceous organic substances. Thus these carbonaceous substances are mineralized in the layer rich in oxygen which the water must pass through before arriving in contact with the denitrifying bacteria. As a result, the denitrification which takes place is an autotropic denitrification, whose output is low.

To overcome this last drawback, the known processes utilize a carbonaceous organic substance, which is incorporated in the water to be treated, and whose dosage must be carefully controlled (for example the Minireef system, registered trademark). Other known processes utilize as the filter medium, porous materials in which a carbonaceous organic substrate is incorporated (for example the NITREX process, registered trademark, patent Nos. EP 0133.405, EP 0102.584 and DE.A.3,434,678), but it is then necessary to replace this porous material as soon as the carbonaceous substrate which it contains is used up.

Moreover, the use of a filter mass has a supplemental drawback particularly related to salt water aquaria. This drawback resides in the fact that the mechanical filtration consecutive to the passage of the water through the filter mass, reduces or prevents the development of numerous filtering organisms, by eliminating a portion or all of the tiny planktonic animals and the organic particles in suspension which constitute their principal food source.

Finally, it will be noted that according to U.S. Pat. No. 4,333,263, the purification by biological means of waters containing organic materials and derivative products is effected without recourse to microorganisms. The nitrates as well as other dissolved mineral substances are absorbed by algae cultivated on screened frames contained in a tank in which the water to be treated circulates. These frames are frequently withdrawn and scraped to eliminate the solid portions of the algae and, as a result, the nitrates and other mineral substances which they have absorbed and fixed. This process known as "Algal scrubber" has the drawback of requiring frequent attention to scrape and eliminate a portion of the cultivated algae. It is important to note that it does not use aerobic or anaerobic microorganisms.

No. DE.A.3,434,678 (H. Hoffman); as shown in a manner to be seen from the drawings, is not concerned with a percolator type apparatus in which the volume of water to be treated traverses the filter mass. The arrows shown in the drawings are indicative. For safety, a bypass can shunt the filter toward chamber 5. There is no volume of confined water, no treatment of the water by diffusion.

No. EP A-0-201,924: this patent describes a device in which water passes through a filter mass by percolation. There is thus circulation of the water. A clarification device for purification of the residual organic waters comprises a reservoir with an inlet conduit, an outlet conduit and a removal conduit for excessive sludge. In the reservoir, which is provided with an external surface as small as possible per unit volume, is disposed an immersed assembly subdivided in zones constituted by a certain number of individual bodies disposed one on the other. In the bottom zone of the reservoir, is disposed a gasification system. The contents of the reservoir are placed in circulation in a direction opposite the ascending gas bubbles diffused by the gasification system, through a conduit by means of an included pump. A movable measurement probe, movable within a probe tube, permits controlling the process which takes place in the different regions of the submerged assembly. With suitable coordination of the gas flow rate, the speed of flow of residual water and the resistance to flow by the submerged body, one can adjust in the individual regions of the submerged body the various conditions, for example aerobic, discretionary and/or anaerobic. The fact that the controlled conditions may be discretionary shows that there is not diffusion but percolation.

No. FR.A.2,079,100: this patent discloses a process for elimination of pollutant organic materials contained in water, characterized by the fact that the water to be purified is caused to pass through a filter bed constituted by an upper layer of a porous material having a specific active surface comprised between 10 and 400 $m^2/g$, said filter bed containing an aerobic bacterial population, under the influence of which there take place, under aerobic conditions at the center of the filter bed, degradation phenomena of the polluting organic materials, with the introduction into the water in the course of purification during its filtration of a quantity of oxygen sufficient to maintain the bacterial population in the aerobic condition, as a function of the content of polluting material and of the quantity of water to be purified.

No. FR.A.2,490,623: this patent describes a treatment process of water in closed circuit aquaculture systems, characterized in that it consists in causing the water to pass through a filtering layer of solid material in which is injected a gas containing oxygen, so as to effect in a single stage, an elimination of the nitrogenous pollution, an oxygenation compensating the consumption of oxygen, and, if necessary, an elimination of the solid waste by filtration, the respective flow rates of the gas containing the oxygen and the water to be treated through the layer of solid material being such that the pH of the water is maintained between 5 and 9.

No. DE.A.2,001,366: filters on the basis of algae and plants for the filtration of substances in suspension in aqueous solutions. The upper layer of the filter bed is constituted by fibrous algae, which are maintained loosely between two screen plates. The lower layer, the benthic layer, is generated from substances in suspension which have been intercepted.

No. DE.A.3,434,678: process and apparatus for the elimination of albumin and its degradation products in water. In a process for elimination of albumin and its degradation products, in residuary waters, one saturates with the water to be purified a filter material having a large contact surface. In order to eliminate also in particular the nitrates present in the water, one utilizes as filter material an inert support material, such as a synthetic material, preferably a porous or foam plastic, of "Blahton" or analogous product, which contains bacteriophilic nutrient products such as lactoses and/or dextroses and/or phthalic ester or equivalent products, and which release these products slowly, over a period of time of long duration, such that the support material constitutes a substrate favorable to the establishment of bacterial colonies. In the filter material, one adjusts a region of aerobic reaction and a region of anaerobic reaction, such that at the interior of the filter material one can obtain the operation of a nitrification process as well as that of a denitrification process.

All these patents describe apparatus for filtration by percolation (the water passes through a filter mass) and not by diffusion.

The present invention has for its object to overcome all these drawbacks by providing the first biological process capable of simultaneously and continuously effecting, in the same reaction space, all the operations which permit totally purifying water containing organic solid materials (particles of various sizes) and dissolved organic materials and dissolved mineral substances from the degradation of said organic materials, and which can be practiced by the aid of simple apparatus capable of functioning without disassembly.

In the following text, the solid or organic materials are designated by the terms "organic particles", and the mineral substances arising from the degradation of said organic materials are called "dissolved pollutants".

The technical characteristics of the process of the invention are as follows:

Process for biological purification of fresh and salt water containing solid and dissolved organic materials and dissolved mineral substances derived from the degradation of said organic materials, and particularly aquarium waters and aquaculture ponds, utilizing the action of aerobic and anaerobic microorganisms having the property of degrading the organic materials and neutralizing the dissolved pollutants. The water is treated inside one or several reactors (tanks) in the interior of which the water is treated by diffusion and the action of anaerobic and aerobic microorganisms. Each reactor comprises, internally, a principal reaction space constituted by a porous or fibrous substance, serving as a support for the different microorganisms utilized, which form a thick separator interposed between the volume of water to be treated and one or several volumes of confined water. The principal reaction space is configured such that it has two interfaces, respectively in contact with the water to be treated, rich in oxygen, and with a confined volume of water poor in oxygen. The principal reaction space comprises, throughout its thickness, several contiguous reaction regions: a reaction region rich in oxygen adjacent the interface in contact with the water to be treated, a reaction region poor in oxygen adjacent the interface in contact with the confined water, and an intermediate region.

The reaction region rich in oxygen adjacent the interface in contact with the water to be treated contains aerobic microorganisms having the property of degrading the organic materials and particularly the aerobic microorganisms having the property of completely mineralizing the nitrogen compounds (transformation to nitrates).

The reaction region poor in oxygen adjacent the interface in contact with the confined water containing the anaerobic microorganisms having the property of neutralizing (transforming to inoffensive products) the dissolved pollutants, and particularly the heterotropic anaerobic microorganisms, having the property of completely reducing the nitrates (reduction of the nitrates to nitrites, then the nitrites to molecular nitrogen) and the nitrites present in the water to be treated.

The intermediate region contains a mixture of aerobic and anaerobic microorganisms.

The volume of confined water is kept in darkness.

The porous or fibrous substance serving as the support for the aerobic and anaerobic microorganisms is preferably a carbonaceous material having a buffer function and having the effect of correcting the pH of the water.

The substance is formed from crushed coral.

The porous or fibrous substance contains the microalgae secured in the thin superficial layer adjacent the interface in contact with the water to be treated; this interface is brightly lighted.

Small waste-eating burrowing organisms are introduced throughout the thickness of the porous or fibrous substance.

For optimum operation of the process of the invention, it is imperative that in the volume of confined water which is poor in oxygen, the concentration of this gas be maintained at about 1 mg/l of water. The principal reaction space is utilized to create gradients of concentration which characterize the internal space of each reactor (gradients of oxygen, nitrogen, carbon dioxide, ammonium ion, nitrites, nitrates, calcium and other dissolved substances).

This process utilizes a portion of the organic materials present in the water to be treated as carbonaceous substrate which is indispensable to the heterotropic denitrifying microorganisms.

This process utilizes means to prevent the light from reaching the volume of confined water and to illuminate the interface of the porous or fibrous substance in contact with said volume of confined water and to prevent any release of oxygen by photosynthesis.

The apparatus for practicing the process is comprised:

by one or several reactors (tanks) in the interior of which the water is treated by diffusion and action of aerobic and anaerobic microorganisms, each reactor comprises, internally, a principal reaction space constituted by a porous or fibrous substance, serving as a support for the different microorganisms utilized, which comprises a thick partition, interposed between the volume of water to be treated and one or several volumes of confined water.

The partition has, throughout its thickness, several reaction regions: a region supersaturated in oxygen, occupied by microalgae and aerobic microorganisms; a region rich in oxygen, occupied by aerobic microorganisms; a region poor in oxygen occupied by anaerobic microorganisms; an intermediate region, in which one finds aerobic and anaerobic microorganisms.

The interior of each reactor comprises one or several thick partitions, attached at their ends to the walls of the reactor.

The device may have a thick horizontal partition or partitions.

The device may have a thick vertical partition or partitions.

The device may have a thick inclined partition or partitions.

The interior of each reactor may comprise one or several thick partitions which are not attached to the walls of the reactor and comprise one or several hollow volumes containing the confined water as shown in FIG. 5.

The porous or fibrous substance forming the divider and serving as support for the different microorganisms utilized is preferably a calcareous material having a buffer function and having a corrective action on the pH of the water.

The partition can be constituted by sand or gravel sandwiched between the screens.

The volume or volumes of confined water may comprise regulation means for the concentration of dissolved oxygen which should be 1 mg/l.

According to another embodiment, the regulation is achieved by controlling the thickness and the density of the layer of porous or fibrous substance comprised between the interface which is in contact with the water to be treated and the interface which is in contact with the volume of confined water.

For a proper operation of the process of the invention, it is imperative that, in the volume of confined water, the concentration of this oxygen be maintained at about 1 mg/l of water; thus, above 1.5 mg/l denitrification is incomplete, and there is the production of nitrites which are particularly toxic substances; below 0.5 mg/l of water, there is generally the production of hydrogen sulfide, which is a toxic gas for most aquatic organisms; this result is achieved by regulating the thickness and the density of the layer of porous or fibrous substance comprised between the interface which is in contact with the water to be treated and the interface which is in contact with the volume of confined water.

The apparatus for practicing the process is comprised by:

one or several reactors (vats) in the interior of which the water is treated by diffusion and action of aerobic and anaerobic microorganisms. It has the following characteristics:

each reactor comprises at its interior a porous or fibrous substance, serving as a support for the different microorganisms utilized, which form a thick partition, interposed between the volume of water to be treated and the volume of confined water.

the partition has, throughout its thickness, several reaction regions: a region supersaturated in oxygen, occupied by microalgae and aerobic microorganisms; a region rich in oxygen occupied by aerobic microorganisms; a region poor in oxygen occupied by anaerobic microorganisms; an intermediate region in which are disposed aerobic and anaerobic microorganisms.

the interior of the reactor comprises one or several partitions.

the partition or partitions is or are horizontal, vertical or inclined; it is attached by its ends to the walls of the reactor; it is of any shape, and it is disposed between the water to be treated and one (or several) volumes of confined water, maintained in darkness, to maintain the essential characteristic of the process of the invention.

alternatively, the partition or partitions is not attached to the walls of the reactor and forms a hollow volume containing the confined water, such that the reactor contains one or several hollow volumes of any shape (spheres, prisms, etc.) between which circulates the water to be treated (this latter embodiment with spheres, prisms, etc. is not shown in the drawings).

the porous or fibrous substance forming the partition and serving as a support for the microorganisms utilized is preferably a calcareous material having buffer power and having a corrective action on the pH of the water.

the reactors (tanks) can be arranged in cascade to constitute an installation in which the water enters at the level of the first tank and leaves at the level of the last tank; when such an installation is utilized in an open circuit, it is necessary to adjust the flow of the pumping installation, and consequently the residence time of the water, so as to obtain pure water at the outlet of the last reactor; when the installation is connected in closed circuit to a pond containing the water to be treated, the flow of the pumping installation can vary widely without noticeably affecting the operation of the installation.

In a particular embodiment of the process of the invention, the reactor is an aquarium, in the interior of which the partition is constituted by sand or gravel, which is sandwiched between two screens, one of the screens, located a short distance from the bottom of the aquarium supports the layer of sand; the other screen, which is located above the first and which, for reasons of appearance, is hidden beneath a thin layer of sand or gravel, serves to prevent the population of the aquarium, and in particular certain fish, from digging out and excavating a portion of the sand, which would have an undesirable effect on the operation of the process by spoiling the stratification of the sand layers forming the partition and interrupting the confinement of the layer occupying the space below the partition; it is the aquarium itself which serves as the reactor and the water it contains is totally purified, without the necessity of using other accessories than those which are necessary for practicing the process of the invention.

The bacteriological reactions, and most particularly the denitrification reactions, liberate acidic products which tend to acidify the medium and decrease the output of the process. To avoid this drawback, the porous or fibrous material serving as a support for the bacteria will preferably be a carbonaceous substance, capable of buffering the medium. There can advantageously be used for this purpose a coarse calcareous sand such as marl (sand constituted by calcareous algae debris and the skeletons of various marine invertebrates), or crushed coral, which are materials which, in addition to their buffering power, offer numerous sites for the securement of the different microorganisms utilized and particularly those which are responsible for the ammonization of the nitrification and the denitrification, by virtue of the high porosity of their constituents. In this particular case, the partitioning of the reactor is effected by disposing marl or crushed coral on a screen, or by filling the space provided between two screens. Excellent results have been obtained with a coarse sand of natural origin, constituted essentially by testae of benthic foramineferia, and comprised by grains having a mean diameter between 2 and 3 mm. Following the neutralization of the acid products, the carbonaceous substrates such as marl and crushed coral dissolve slowly while liberating calcium ions which tend to render the medium alkaline. As a result, it is not necessary to use carbonaceous substrates or the quantities thereof that are used can be reduced, by mixing with a neutral product, when the process is practiced to purify certain fresh water aquaria in which it is desired to maintain an acid pH. On the other hand, the liberation of calcium ions is very desirable in the case of marine aquaria, as this phenomenon permits maintaining the equilibrium of the $CO_2$ system, and as a result preserves the buffering power and the alkalinity of the pH of the seawater. These properties of seawater are preserved, even when the aquarium contains numerous organisms capable of fixing large quantities of calcium carbonates, such as calcareous algae, Scleractinians, mollusks, tube worms, etc. Moreover, under these conditions, the organisms in question can, without any limitation, take from the water which surrounds them the calcium necessary for forming their skeleton. In extreme cases, the process of dissolution is sufficiently rapid to render necessary a periodic supply of carbonaceous substrate.

The organic particles in suspension in the water to be treated are degraded by bacteria which develop on their own surface, while those which come into contact with the porous or fibrous substance which serves as a support for the different microorganisms utilized, are degraded and transformed into dissolved substances by the aerobic microorganisms which are located in the layer rich in oxygen. An important point of novelty of the present invention resides in the fact that the water to be treated does not pass through the principal reaction space constituted by the porous or fibrous material used. The exchanges of dissolved substances which take place between the water to be treated, the confined water, and the different reaction regions located in the principal reaction space, take place by diffusion, particularly through the interfaces which serve as boundaries between these different elements. The microorganisms responsible for the ammonization and the nitrification occupy the reaction region rich in oxygen, adjacent the interface in contact with the water to be treated, and transform the nitrogenous compounds into nitrites and nitrates which diffuse in the direction of the region poor in oxygen where they are reduced by the heterotropic denitrifying microorganisms located there. It appears that a large proportion of the nitrites thus formed are reduced before having been transformed into nitrates. These heterotropic bacteria utilize as the organic carbon source a portion of the carbonaceous compounds present in the reaction medium, and come from the water to be treated. The molecular nitrogen, liberated by the reduction of the nitrate ions, diffuses in the direction of the layer rich in oxygen. It then passes into the water to be treated and finally reaches the atmosphere. Similarly, the calcium ions liberated in the principal reaction space by the neutralization of the acid compounds produced by the different microorganisms utilized and particularly by heterotropic anaerobic microorganisms, diffuse in the direction of the water to be treated. These are flows of oxygen, nitrates, nitrogen, etc., which pass through the different interfaces, as a function of the concentration gradients which characterize the space in which the reactions take place. For this reason there is no risk of plugging up. Another advantage, resulting from the fact that the material exchanges take place by diffusion, is evident when the purification of the water is carried out in a closed circuit, comprising the reactor and a receptacle containing the water to be treated. In this case, accordingly, the residence time of the water within the reactor is practically without influence on the operation of the process, which means that it is useless to regulate the output of the pumping installation. This result is obtained by regulating the thickness of the layer of porous material.

This operation is within the skill of a person in the art and does not depart from the scope of the present invention.

In a modification of the process of the invention, the outermost portion of the layer which is in contact with the water to be treated is strongly illuminated and serves to support microalgae which are thus associated with the aerobic bacteria. Under the influence of the light, the microalgae produce oxygen which saturates the layer in which they are located.

The abundance of oxygen accelerates the degradation of the organic materials by the aerobic microorganisms and particularly facilitates the work of the ammonizing and nitrifying bacteria, which has the effect of avoiding the accumulation of intermediate toxic products which are ammonium ions (and particularly the non-dissociated $NH_3$ fraction, very toxic) and the nitrite ions. This is particularly important in the case of marine aquaria containing tropical organisms, in which the basic pH and the high temperature ensure that the non-dissociated percentage ($NH_3$) is very high. This modification which has the effect of increasing the production of the process, without changing its fundamental principles, does not depart from the scope of the invention.

In another embodiment of the process of the invention, the porous or fibrous material serving as a support for the microalgae and the bacteria, contains small burrowing detritus-eating organisms such as those which live naturally in aquatic sediments. These small organisms take part in the elimination of organic wastes by eating those that come into contact with the partition. Moreover, they disseminate organic particles throughout the thickness of the porous or fibrous material, by their elimination and by their mechanical action of biostirring, which has the result of facilitating the degradation of the organic particles which are incorporated in the layer rich in oxygen, and facilitating the contact of the carbonaceous substrate with the heterotropic denitrifying microorganisms which are located in the region poor in oxygen. As before, this embodiment which has the result of increasing the output of the process, without changing its fundamental principles, does not depart from the scope of the invention. It will be merely noted that the biostirring activity of these small organisms should be sufficiently moderate so as not to introduce too much oxygen or organic particles into the layer poor in oxygen which shelters the denitrifying microorganisms. Otherwise, the operation of the process would be seriously disturbed with, as a principal result, a sharp drop in the output of the denitrification reactions and possible accumulation of toxic substances in the form of nitrite ions. This risk is easily avoided by selecting organisms of very small size, which is within the skill of a person in the art and does not depart from the scope of the present invention.

According to an essential characteristic of the process of the invention, the different organisms, microorganisms and microalgae utilized by the process of the invention are introduced into the reaction space from stocks selected for their effectiveness and cultivated for this purpose. It is however possible to use as the reaction assembly, an aquatic sediment, directly removed from its natural surroundings, and containing all its fauna, its macrofauna and its microflora. It should be noted however that the degree of purification of the water and the reliability of the process of the invention depend as much on the respective properties of the living and non-living constituents of the reaction assembly, as on the conditions of operation which have been described and defined above.

The process therefore has altogether striking advantages, to which is added the simplicity of its operation.

The invention will be further illustrated without in any way being limited by the following description, given with reference to the accompanying drawings in which:

FIG. 1 shows schematically an installation for practicing the process of the invention, constituted by a reactor (tank), having a horizontal partition 1, constituted by the porous or fibrous substance which serves as a support for the different biologically active components used in the process of the invention.

Figure 1A:
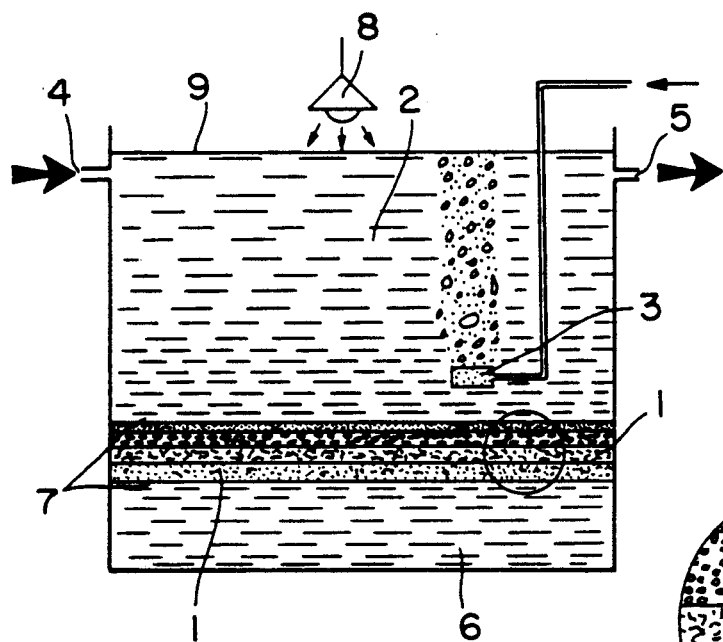
FIGS. 1a and 1b show a section illustrating schematically an installation for practicing the process of the invention in a reactor (tank) traversed by the water to be treated, and having only a single horizontal partition.
Figure 1B:
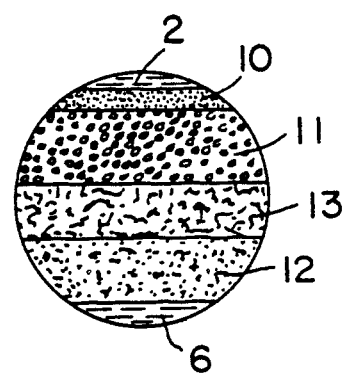

The water to be treated, whose level is schematically represented by horizontal line 9, circulates within the reactor, in the space 2 located above the partition 1. It is aerated and agitated by injection of air through a diffuser 3. It enters the reactor by opening 4 and leaves by opening 5. The volume of confined water, poor in oxygen, occupies in the lower portion of the reactor the space 6 situated below the partition 1. As shown in FIG. 1, the confined volume 6 communicates with the open volume 2 only through the porous partition 1. The interface (wall) 7 of the partition which is in contact with the water to be treated is brightly illuminated by means of a lamp or the sun 8. The partition 1 has, throughout its thickness, several reaction regions: a region 10 supersaturated in oxygen occupied by microalgae and aerobic microorganisms; a region 11 rich in oxygen occupied by aerobic microorganisms; a region 12 poor in oxygen occupied by anaerobic microorganisms; and intermediate region 13 in which are located aerobic and anaerobic microorganisms. An installation of this type is suitable for the treatment, in a closed circuit, of water contained in a storage tank. For treating water in an open circuit, there will preferably be used an installation of the type which is described in FIG. 3 or FIG. 4.

Figure 2:
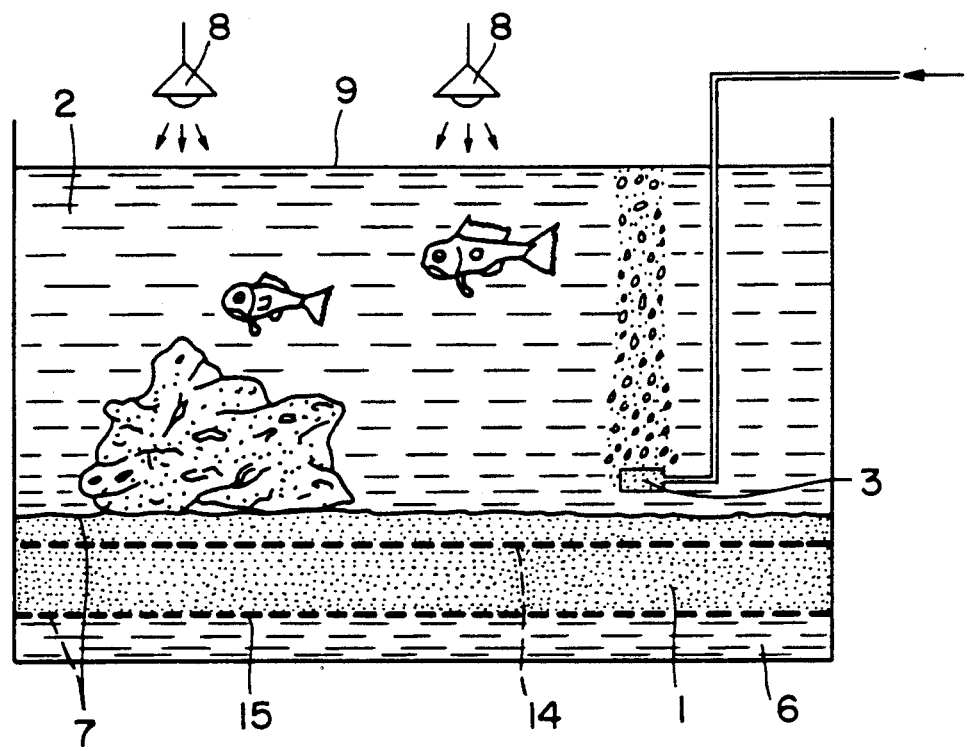
FIG. 2 shows a section illustrating schematically an installation for practicing the process of the invention within an aquarium, and according to which it is the aquarium itself which is utilized as the reactor.

FIG. 2 shows schematically a modification according to which the process is directly practiced within an aquarium. The same references designate the same elements as in FIG. 1. In this case, the partition 1 constituted by sand or gravel, which is sandwiched between two screens 14 and 15. The screen 15, situated a short distance from the bottom of the aquarium, supports the layer of sediment. The screen 14, hidden for the sake of appearance beneath a thin layer of sediment, prevents the population of the aquarium, and in particular certain fish, from digging and blowing away a portion of the sediment, which would result in upsetting the function of the process and destroying the stratification of the sediment layer and interrupting the confinement of the water occupying the space 6 located below the partition. In this embodiment of the apparatus, it is the aquarium itself which serves as the reactor. The water it contains is totally purified, without the need for using other accessories than those necessary for practicing the process of the invention.

Figure 3:
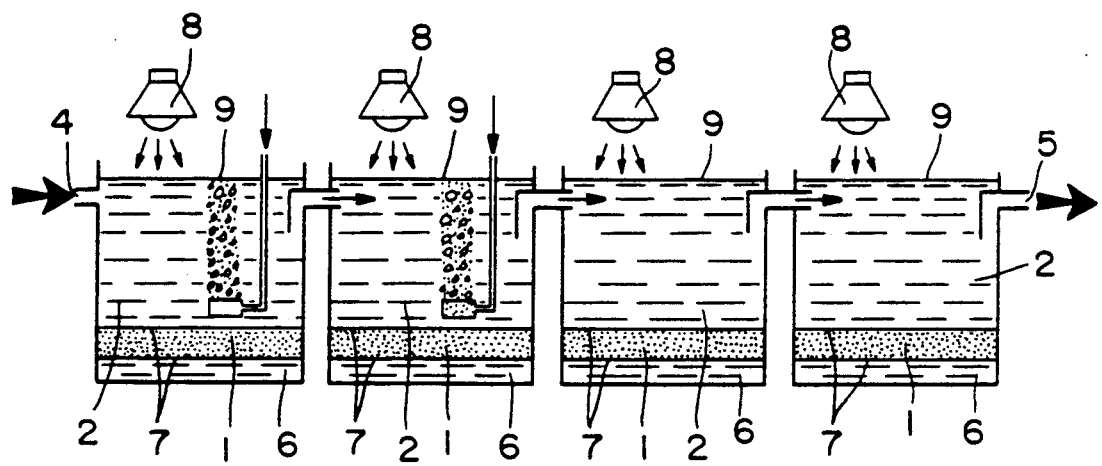
FIG. 3 is a schematic cross section analogous to FIG. 1, illustrating a modification of the installation shown in FIG. 1, in which several reactors (tanks) are associated in cascade.

The flow rate requirements vary according to whether the installation is used in open circuit or in closed circuit and are the same as those for the installation described in FIG. 3.

Tables I, II and III show the variation of the values of pH and the concentration of the ions $NH_4^+$ $NO_2^-$, $NO_3^-$ and $CA^{++}$ in the water of three aquaria in closed circuit, in which no change of the water has taken place, respectively for ten months (Table I and II) and four years (Table III).

TABLE I

|  | MONTHS | | | | | | | |
| --- | --- | --- | --- | --- | --- | --- | --- | --- |
|  | 1 | 2 | 3 | 4 | 6 | 8 | 10 | 4 (YRS) |
| $NH_4+$ (mg/l) | 0.06 | 0.04 | 0.04 | 0.04 | — | — | 0.03 | — |
| $NO_2-$ (mg/l) | 0.08 | 0.08 | 0.08 | 0.08 | — | — | 0.08 | — |
| $NO_3-$ (mg/l) | 55.4 | 92.3 | 164 | 196 | — | — | 390 | — |
| pH (units) | 8.3 | 8.2 | 7.8 | 8.1 | — | — | 7.3 | — |

TABLE II

|  | MONTHS | | | | | | | |
| --- | --- | --- | --- | --- | --- | --- | --- | --- |
|  | 1 | 2 | 3 | 4 | 6 | 8 | 10 | 4 (YRS) |
| $NH_4+$ (mg/l) | 0.23 | 0.17 | 0.23 | 0.11 | — | — | 0.11 | — |
| $NO_2-$ (mg/l) | 0.05 | 0.05 | 0.05 | 0.05 | — | — | 0.05 | — |
| $NO_3-$ (mg/l) | 41.9 | 62.9 | 137.5 | 163.2 | — | — | 281 | — |
| pH (units) | 8.3 | 8.1 | 7.8 | 7.9 | — | — | 6.5 | — |

TABLE III

|  | MONTHS | | | | | | | |
| --- | --- | --- | --- | --- | --- | --- | --- | --- |
|  | 1 | 2 | 3 | 4 | 6 | 8 | 10 | 4 (YRS) |
| $NH_4+$ (mg/l) | 0.001 | 0.001 | 0.001 | 0.001 | 0.001 | 0.001 | 0.001 | 0.001 |
| $NO_2-$ (mg/l) | 0.002 | 0.001 | 0.002 | 0.004 | 0.008 | 0.002 | 0.001 | 0.001 |
| $NO_3-$ (mg/l) | 0.350 | 0.230 | 0.007 | 0.012 | 0.006 | 0.008 | 0.006 | 0.013 |
| $Ca^{++}$ (mg/l) | 480 | 480 | 460 | 500 | 490 | 480 | 480 | 520 |
| pH (units) | 8.22 | 8.26 | 8.30 | 8.25 | 8.20 | 8.22 | 8.25 | 8.24 |

In the modification shown schematically in FIG. 3, the same references designate the same elements as in FIG. 1. The difference consists in that several tanks are used in cascade to constitute an installation in which the water enters at the level of the first tank and leaves at the level of the last tank. The water to be treated enters the apparatus by opening 4 and leaves through 5. When such an installation is used in an open circuit, it is necessary to adjust the flow rate of the pumping apparatus, and hence the dwell time of the water, so as to obtain pure water at the outlet 5 of the last reactor. When the installation is connected in a closed circuit, to a pond containing the water to be purified, the flow rate of the pumping apparatus can vary over a wide range without noticeably affecting its operation. In this system, the water which arrives in the last tank or tanks no longer contains (or contains only very little) organic material, it is no longer necessary to aerate and agitate it. The last tank or tanks thus serve as a settling pond in which mineral particles in suspension settle out.

Figure 4:
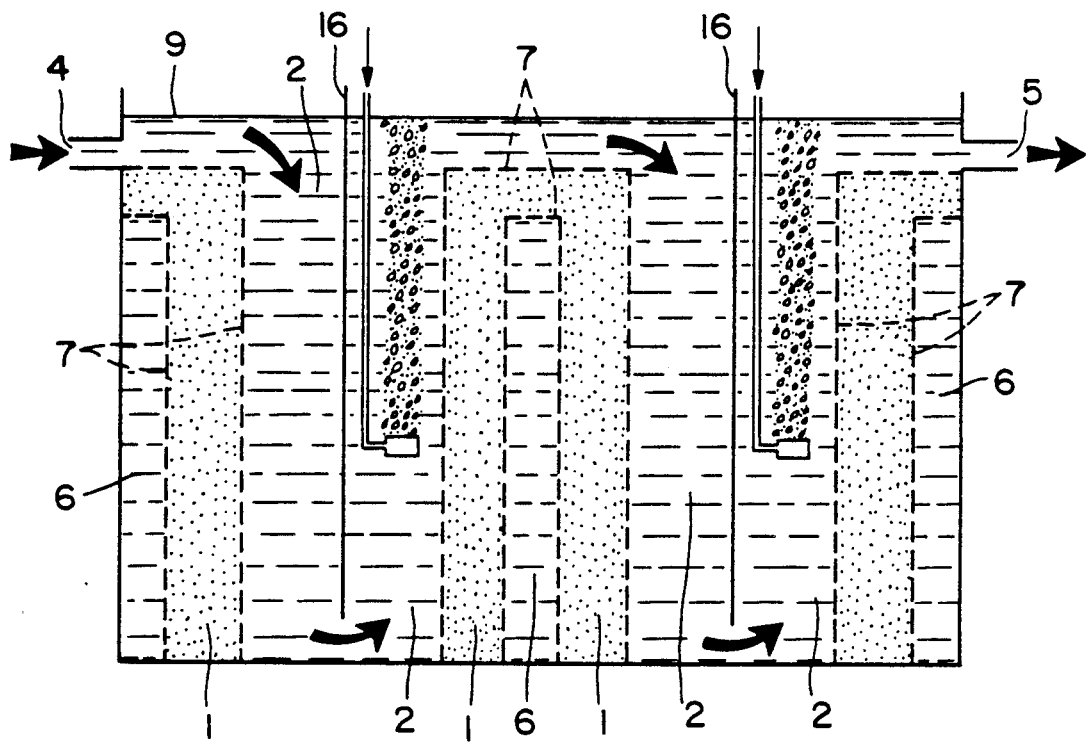
FIG. 4 shows a section illustrating schematically an installation for practicing the process of the invention in a reactor (tank), traversed by the water to be treated, and having several vertical partitions.
Figure 5:
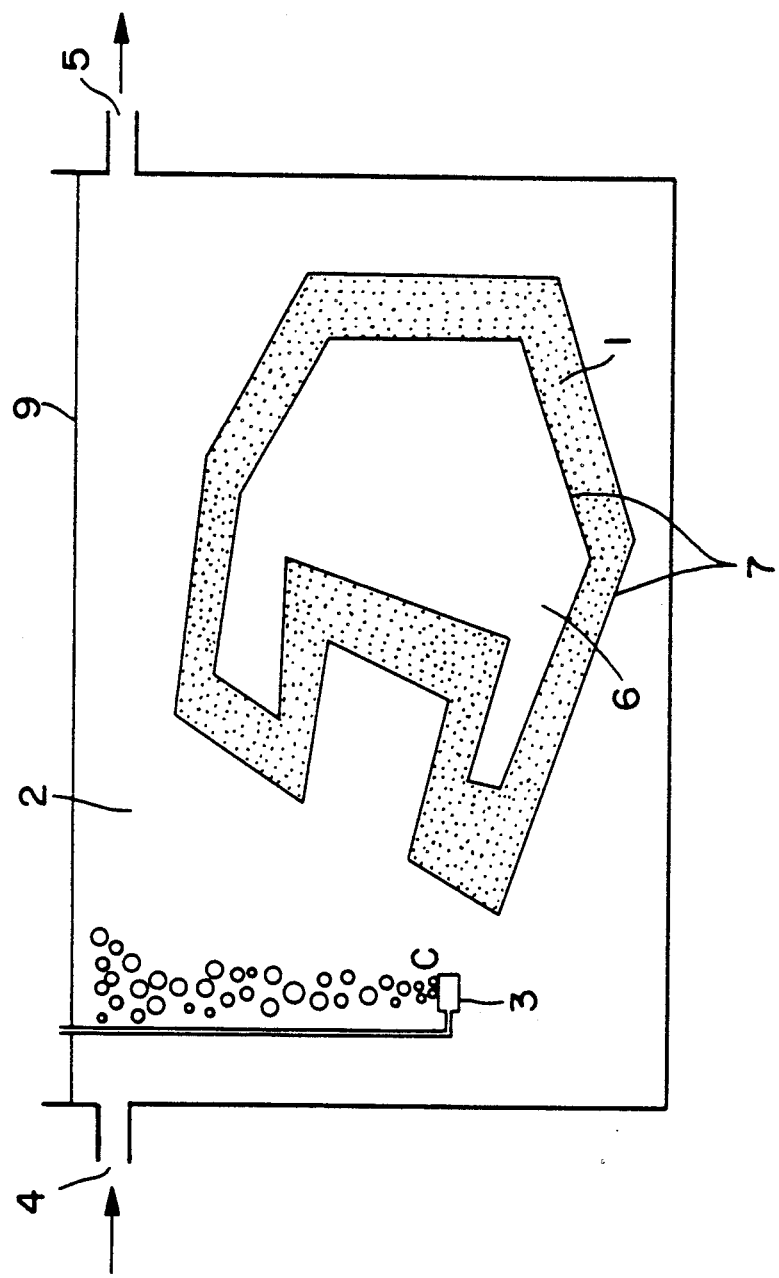
FIG. 5 shows a tank having a partition not attached to the walls of the tank and comprising a hollow volume containing the confined water.

FIG. 4 shows schematically an installation for practicing a process of the invention constituted by a reactor (tank) having several vertical partitions. The same reference numerals designate the same elements as in FIG. 1. In addition to the active partitions constituted by the substance which serves as a support for the biological components utilized by the process of the invention, there are provided thin watertight partitions 16 whose role is limited to channeling the water which circulates in the reactor. The principal advantage of this embodiment of the process resides in the fact that there is provided a large exchange surface within a small volume.

Comparative tables for the values of pH and the concentrations of $NH_4+$, $NO_2-$, $NO_3-$ and $CA^{++}$ in the water of two salt water aquaria in closed circuit, in which no change of the water has taken place, respectively for ten months (Tables I and II) and four years (Table III).

TABLE I: Aquarium provided with a filter under active shell sand, and containing no fish (the values of the table have been calculated according to the curve published in TERVERS, 1979 page 48).

TABLE II: Aquarium provided with vertical filtration on polyether foam and reverse drainage on polyether foam, and containing no fish (the values of the table have been calculated according to the curves published in TERVERS, 1979 page 52).

TABLE III: Aquarium operating according to the process of the invention, and containing fish as well as numerous living corals (Scleractinians), crown urchins and various other invertebrates. The measurements of pH were made at about 5 pm. Thus, the pH of the water of the aquarium taking part in the experiment, had cyclic variations over a period of 24 hours, with a mean minimum value of 7.80 units of pH at 8 am and a maximum value of 8.25 units of pH at 5 pm.

In aquaria I and II, provided with conventional biological filters, the pH which is normal one month after putting the aquaria into operation, falls gradually until, at about 10 months, it achieves respectively the values of 7.3 (aquarium I) and 6.5 (aquarium II). The concentrations of nitrate ($NH_4+$) rise rapidly. At the end of one month, they achieve respectively the values of 54.4 mg/l (aquarium I) and 41.9 mg/l (aquarium II). At the end of ten months, these concentrations have become quite high: 390 mg/l (aquarium I) and 281 mg/l (aquarium II).

In the aquaria provided according to the invention: the concentration of calcium ions is high and stable (460 to 520 mg/l), the pH remains normal and stable. The concentrations of the ions $NH_4^+$ and $NO_2^-$ are from 10 to 100 times lower than in the aquaria I and II which are provided with conventional filters, the comparison of the concentration of nitrate ions ($NO_3^-$) shows in a particularly striking way the high degree of purification of the water, obtained according to the process of the invention. Thus, at the end of the tenth month of operation, the concentration of nitrate in the water of aquarium III is about 50,000 times less than that of the water of aquaria I and II.

What is claimed is:

1. A process for biologically purifying aquarium water and aquaculture ponds water as well as fresh water or salt water carrying solid organic substances or dissolved organic substances or dissolved mineral substances from the degradation of said organic substances which process comprises:
   (a) flowing water to be purified through at least one path;
   (b) stirring and contacting said water to be purified, in said path, with oxygen or with an oxygen rich gas, to provide aerobic conditions in said water to be purified;
   (c) filling a confined volume with oxygen impoverished water to provide anaerobic conditions and linking, through a porous connector, said confined oxygen impoverished water with said water to be purified:
      (i) creating in the thickness of said connector, one aerobic zone in contact with said water to be purified, and one anaerobic zone in contact with said confined water, and
      (ii) establishing between said water to be purified and said confined oxygen-impoverished water, gradients of concentration of dissolved mineral substances that compel said mineral substances to diffuse throughout said porous connector according to said gradients of concentration;
   (d) introducing unicellular aerobic microorganisms in said porous connector aerobic zone in contact with said water to be purified, to transform into mineral substances, solid as well as dissolved organic substances carried by said water to be purified; said aerobic microorganisms comprising bacteria that transform organic nitrogen into $NH_4^+$, then $NH_4^+$ into $NO_2^-$, then $NO_2^-$ into $NO_3^-$;
   (e) introducing unicellular anaerobic microorganisms in said porous connector anaerobic zone in contact with said confined water, to reduce said mineral substances; said anaerobic microorganisms comprising heterotrophic denitrifying bacteria which transform into molecular nitrogen and oxygen nitrites and nitrates that diffuse from said porous connector aerobic zone to said porous connector anaerobic zone;
   (f) substantially preventing light from reaching said porous connector anaerobic zone to prevent any photosynthetic oxygen release in said porous connector anaerobic zone; and
   (g) introducing in the thickness of said porous connector pluricellular burrowing detritus-eating animals that supply said heterotrophic denitrifying bacteria with organic carbon; said organic carbon coming from organic substances carried by said water to be purified and being incorporated into said porous connector anaerobic zone by the excretion as well as by the biostirring activity of said burrowing detritus-eating animals; said biostirring activity being sufficiently low to maintain in said porous connector an oxygen-impoverished zone having an oxygen content not exceeding about 1.5 mg/l and an oxygen-rich zone having an oxygen content greater than said oxygen-impoverished zone.

2. The process of claim 1 further comprising contacting inside said porous connector, acid products released by aerobic and anaerobic microorganisms with calcareous material having a buffering power, to neutralize said acid products and release $Ca^{++}$; said $Ca^{++}$ diffusing from said porous connector to said water to be purified, thus maintaining alkaline the pH of said water to be purified.

3. The process of claim 1 further comprising introducing microalgae in the superficial layer of said porous connector aerobic zone and exposing said microalgae to subsaturating photosynthetic photon flux area densities to supersaturate with photosynthetically released oxygen, both said porous connector aerobic zone and the layer of said water to be purified in contact with said porous connector aerobic zone.

4. The process of claim 1 further comprising regulating the intensity of the oxygen flux that diffuses, throughout said porous connector, from said water to be purified to said confined water, to keep the oxygen content of said confined water within a concentration range of 0.5 to 1.5 mg.l$^{-1}$; said regulation being achieved by regulating the thickness and the density of said porous connector.

5. Apparatus for biologically purifying fresh or salt water containing solid or dissolved organic substances or dissolved mineral substances generated by degradation of said organic substances, comprising at least one tank and a porous partition disposed within said tank and dividing said tank into at least one closed volume cell and an open volume cell, said closed volume cell communicating with said open volume cell only through said porous partition; said partition comprising a layer of fibrous substance or compacted or confined particulate material; said layer of fibrous substance or particulate material further comprising aerobic microorganisms occupying a first region of said layer adjacent said open volume and anaerobic microorganisms occupying a second region of said layer adjacent said closed volume.

6. The apparatus as defined in claim 5 wherein said partition exhibits several reaction regions: a first region supersaturated in oxygen, occupied by microalgae and aerobic microorganisms; a second region of lesser oxygen concentration than said first region, occupied by aerobic microorganisms; a fourth region occupied by anaerobic microorganisms and having an oxygen concentration lower than said first and second regions and not exceeding about 1.5 mg/l; and a third region intermediate said second and fourth regions, within which anaerobic and aerobic microorganisms are present.

7. The apparatus as defined in claim 5 wherein the interior of each said at least one tank comprises a plurality of said porous partitions.

8. The apparatus as defined in claim 5 wherein the interior of each said at least one tank comprises at least one said porous partition attached to the walls of said tank.

9. The apparatus as defined in claim 8 wherein said porous partition is disposed horizontally within said tank.

10. The apparatus as defined in claim 8 wherein said porous partition is disposed vertically within said tank.

11. The apparatus as defined in claim 8 wherein said porous partition is inclined.

12. The apparatus as defined in claim 5 wherein the interior of each said at least one tank comprises at least one said porous partition which is not attached to the walls of the tank; said porous partition forming at least one enclosed hollow volume defining said closed volume cell.

13. The apparatus as defined in claim 5 wherein said porous partition comprises calcareous material having a buffering capacity to maintain alkaline the pH of said water to be purified.

14. The apparatus as defined in claim 5 wherein said porous partition comprises sand or gravel sandwiched between two screens.

15. The apparatus as defined in claim 5 wherein said anaerobic microorganisms maintain a concentration of dissolved oxygen below 1.5 mg/l within said closed volume cell.

* * * * *

UNITED STATES PATENT AND TRADEMARK OFFICE
CERTIFICATE OF CORRECTION

PATENT NO. : 4,995,980
DATED : February 26, 1991
INVENTOR(S) : Jean M. JAUBERT

It is certified that error appears in the above—identified patent and that said Letters Patent is hereby corrected as shown below:

Column 14, line 46, change "no" to --only--;

Column 14, line 51, change "no" to --only--.

Signed and Sealed this

Twenty-eighth Day of April, 1992

Attest:

HARRY F. MANBECK, JR.

*Attesting Officer*      *Commissioner of Patents and Trademarks*